Aug. 9, 1966 D. W. ADEN 3,265,176
ARTICLE DISPENSER FOR SUSPENDED ARTICLES
Filed Oct. 17, 1963 9 Sheets-Sheet 1
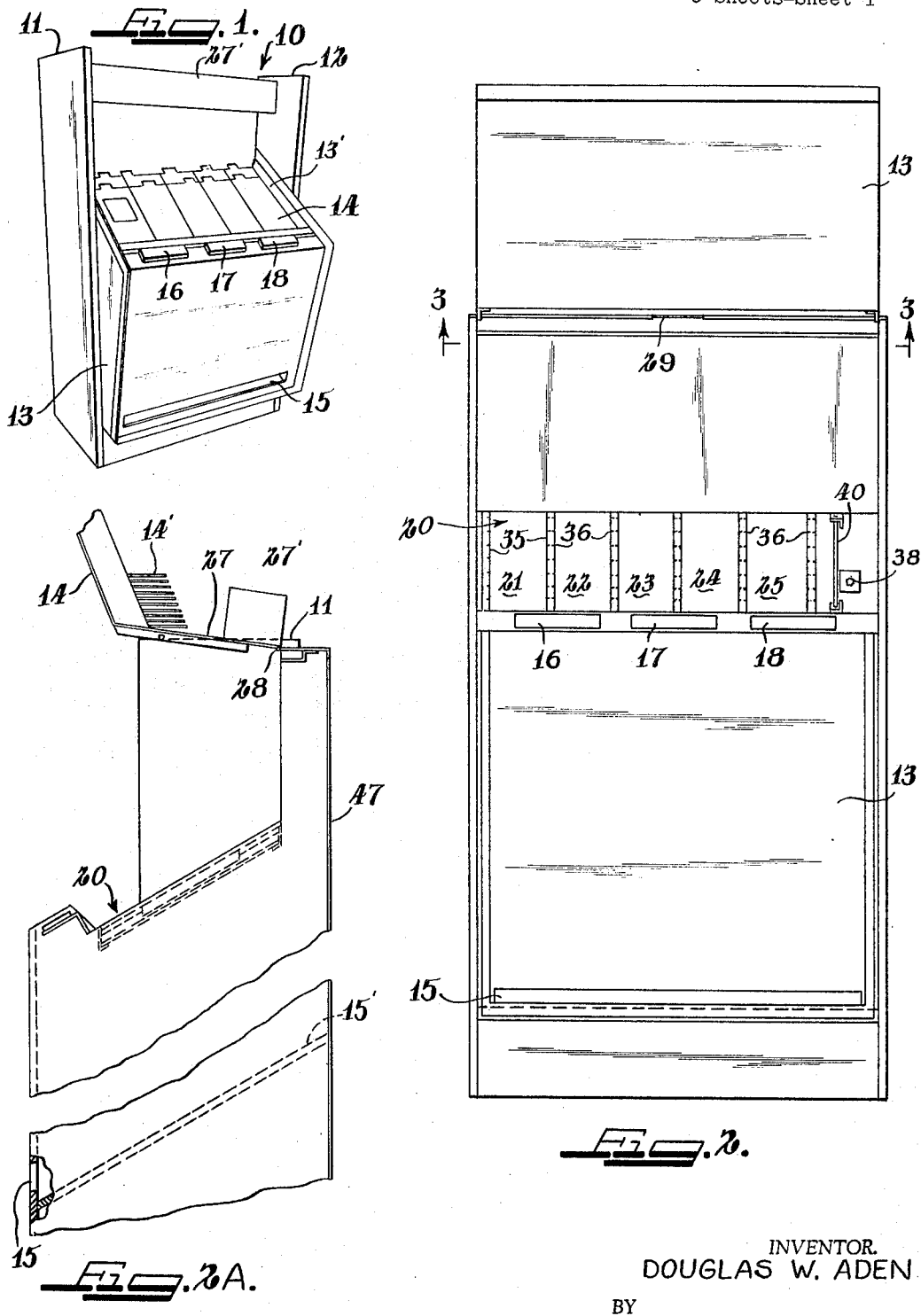
INVENTOR.
DOUGLAS W. ADEN
BY
Greist, Lockwood, Greenawalt & Dewey
Attys.

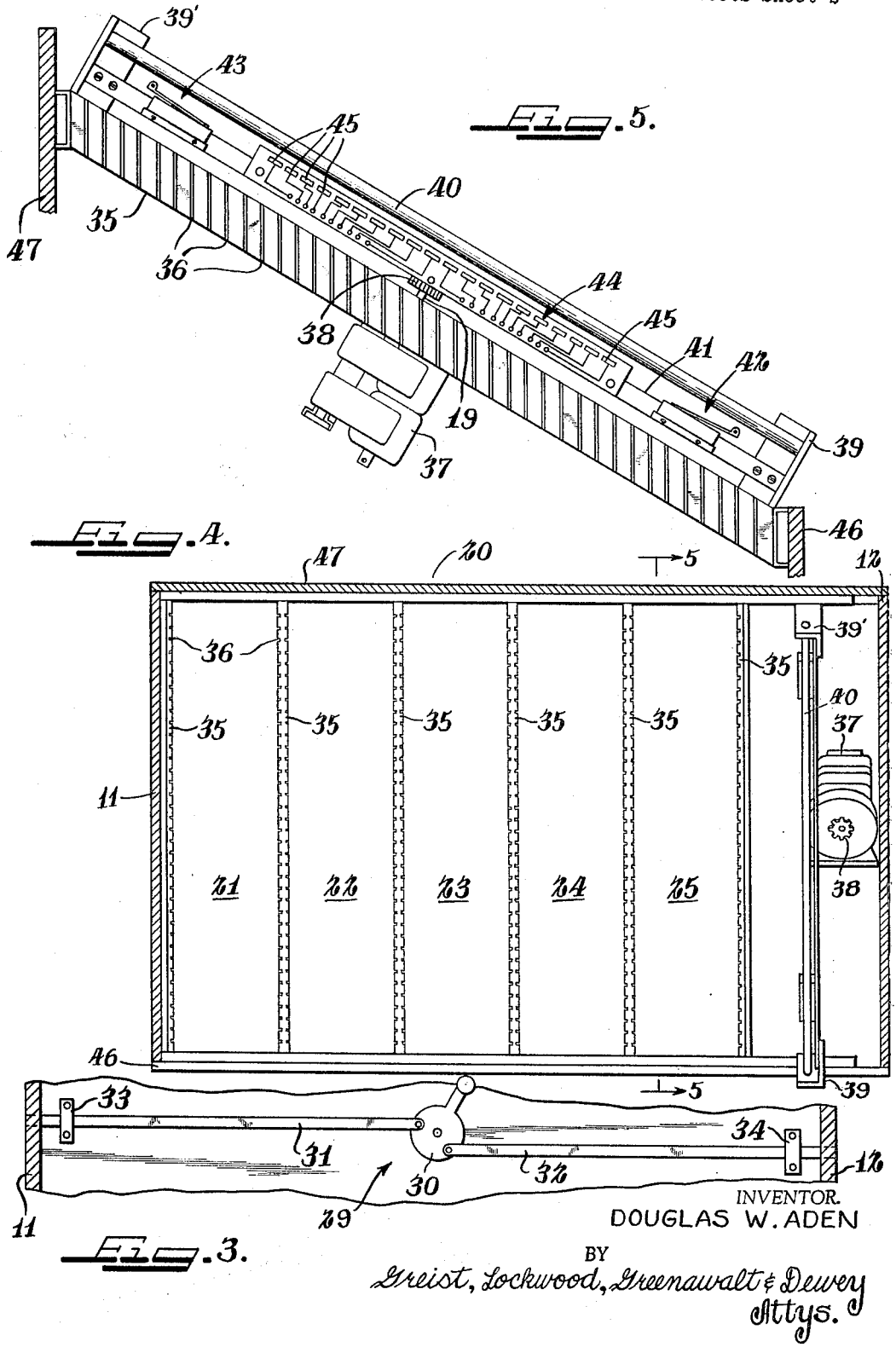

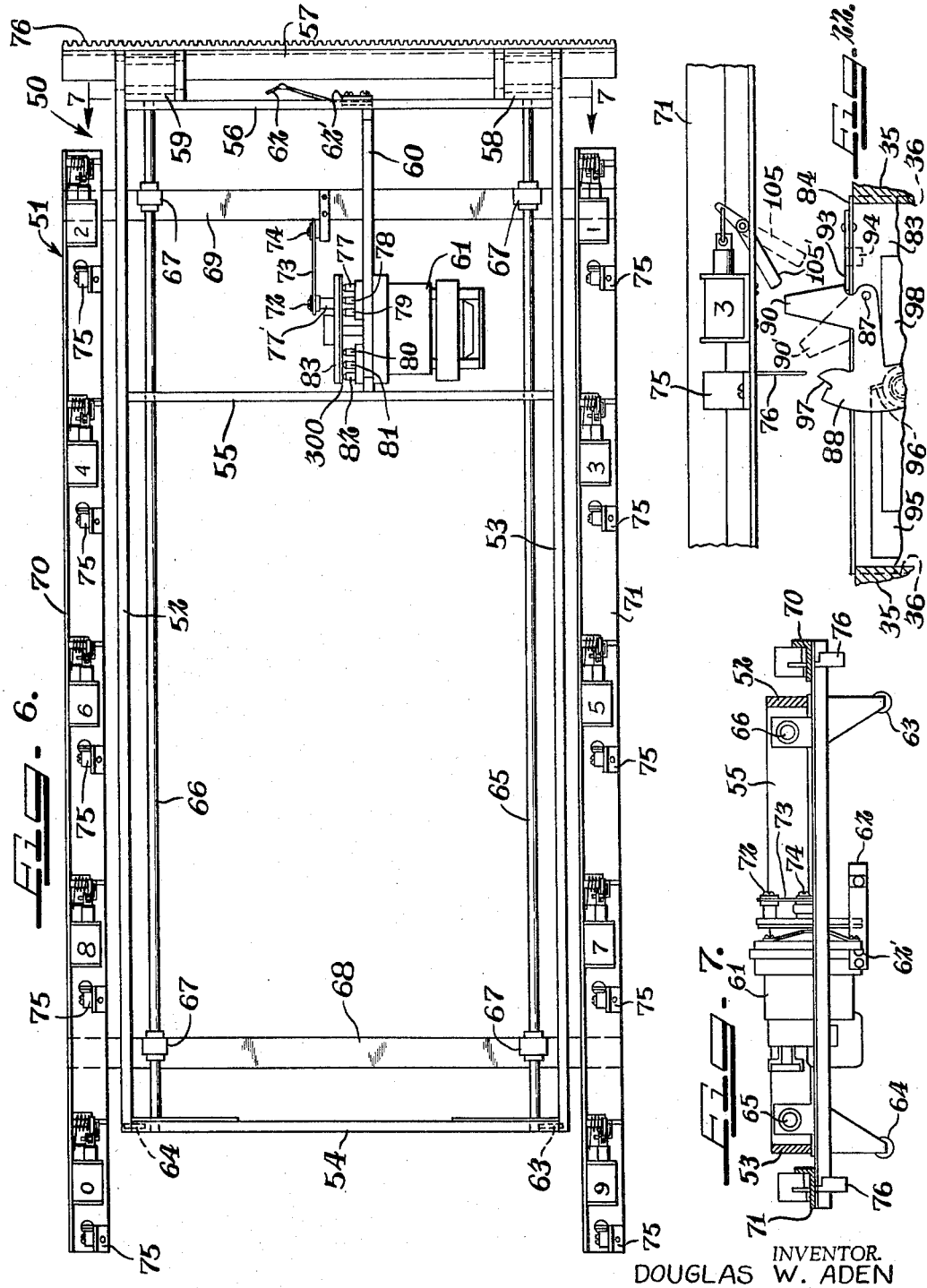

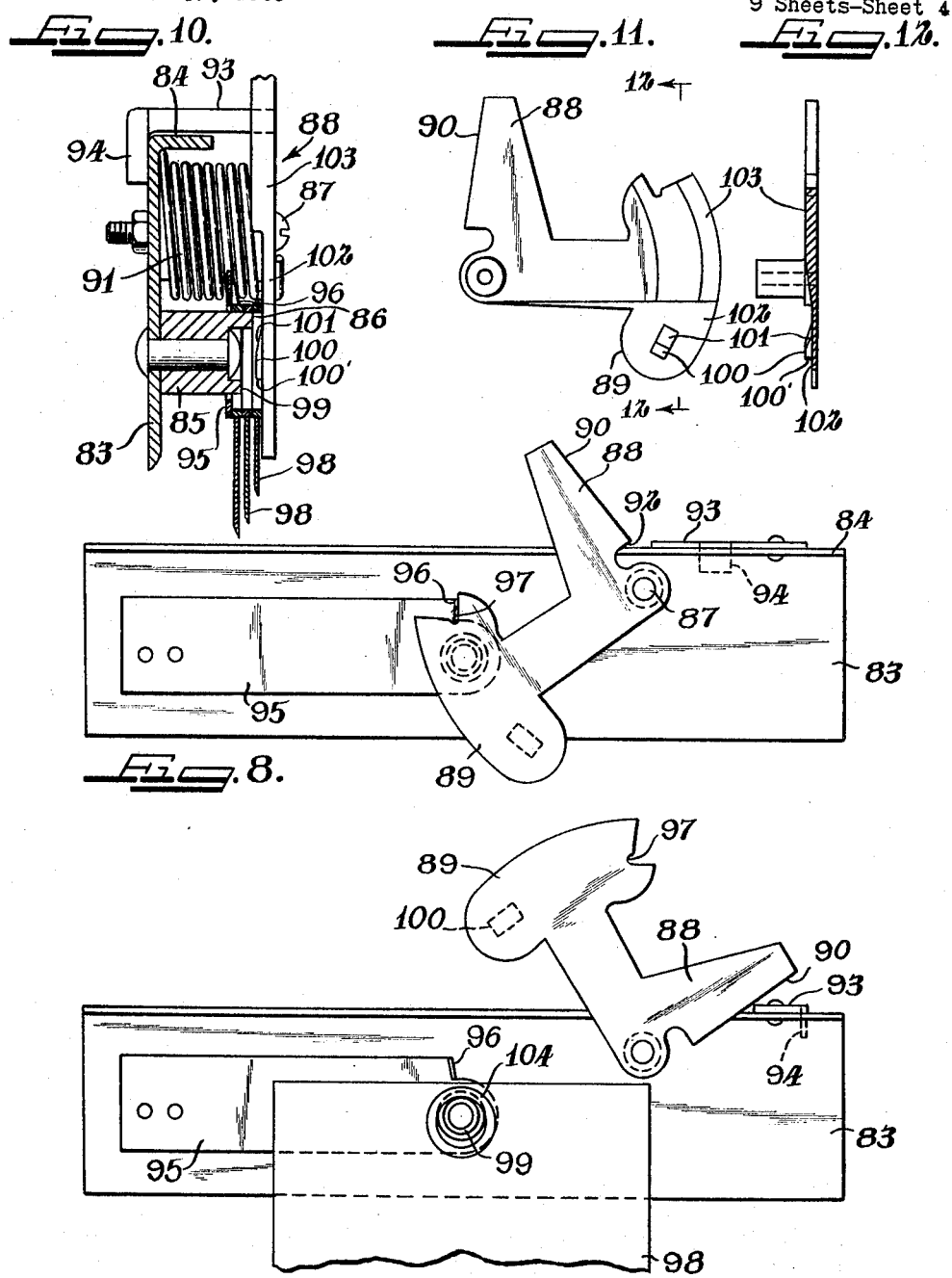

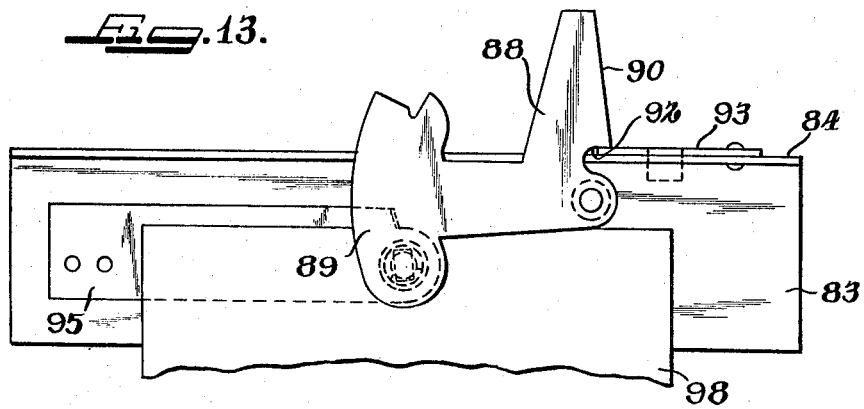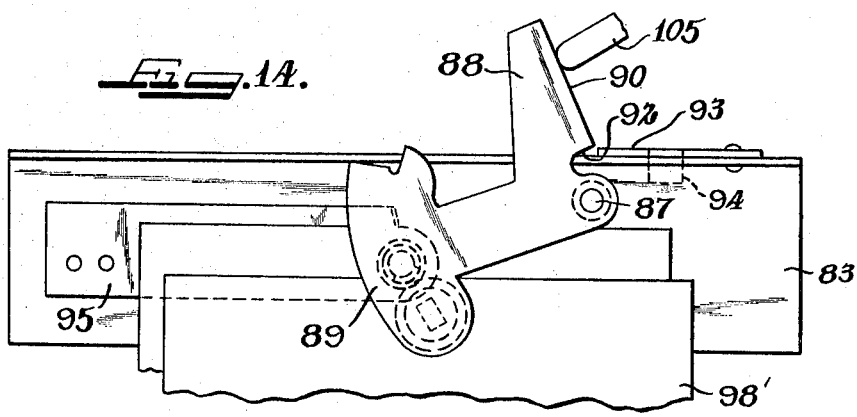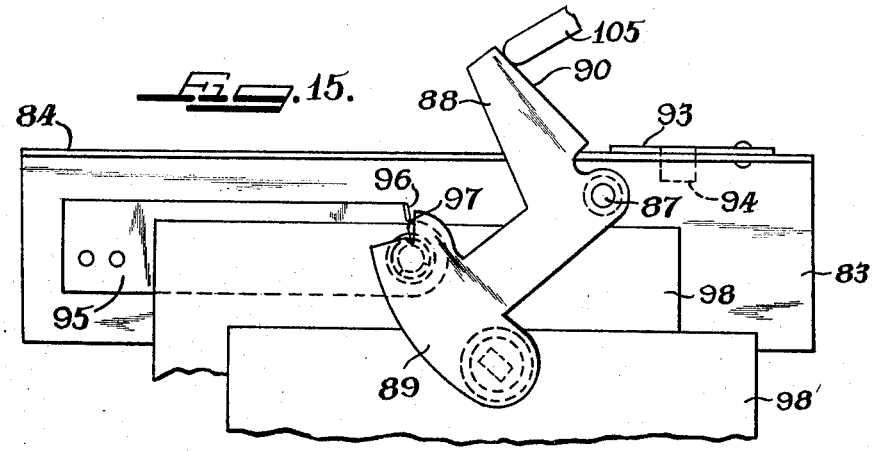

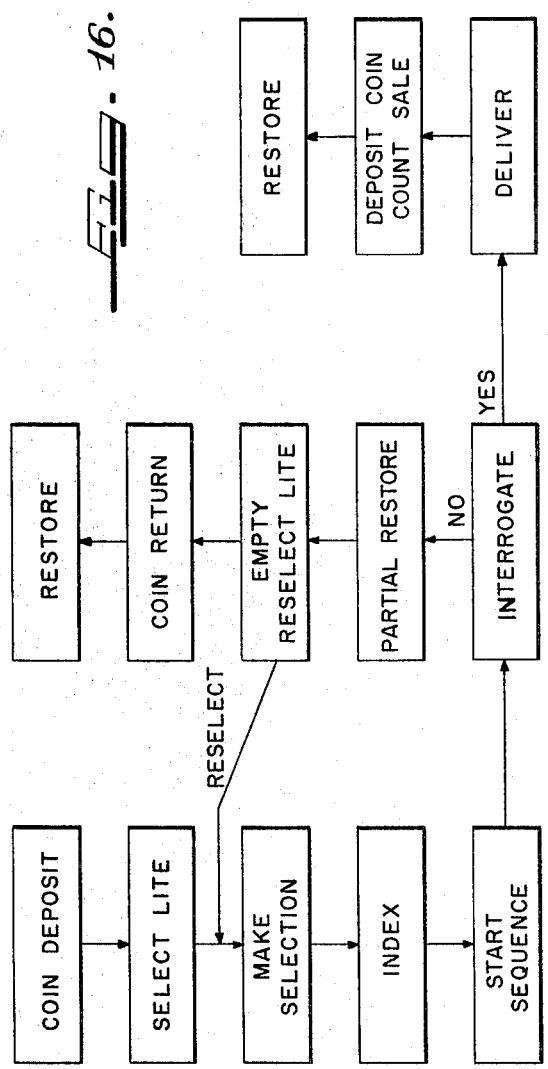
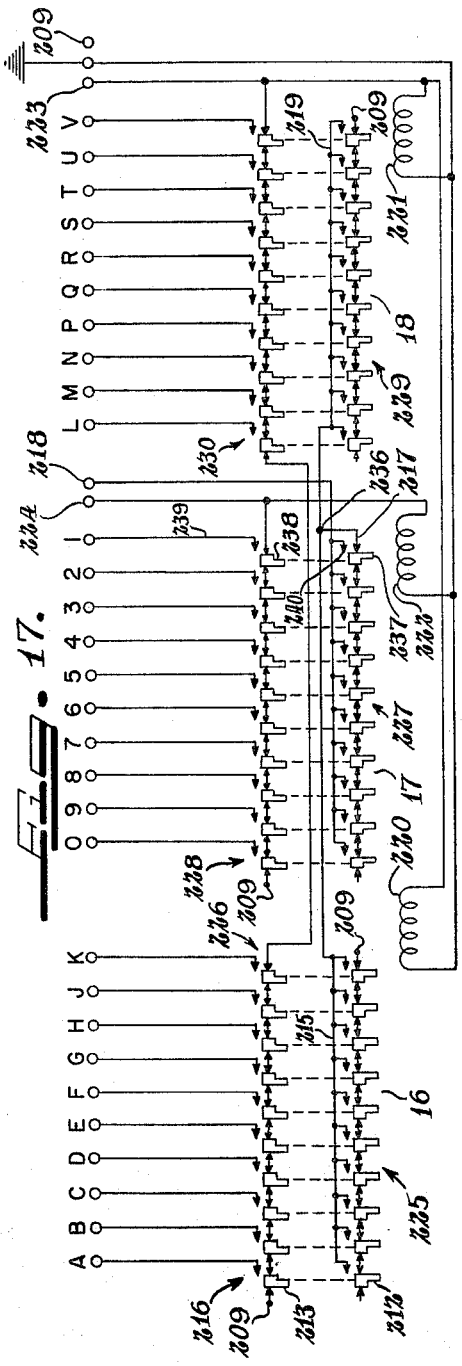

Aug. 9, 1966 D. W. ADEN 3,265,176
ARTICLE DISPENSER FOR SUSPENDED ARTICLES
Filed Oct. 17, 1963 9 Sheets-Sheet 7
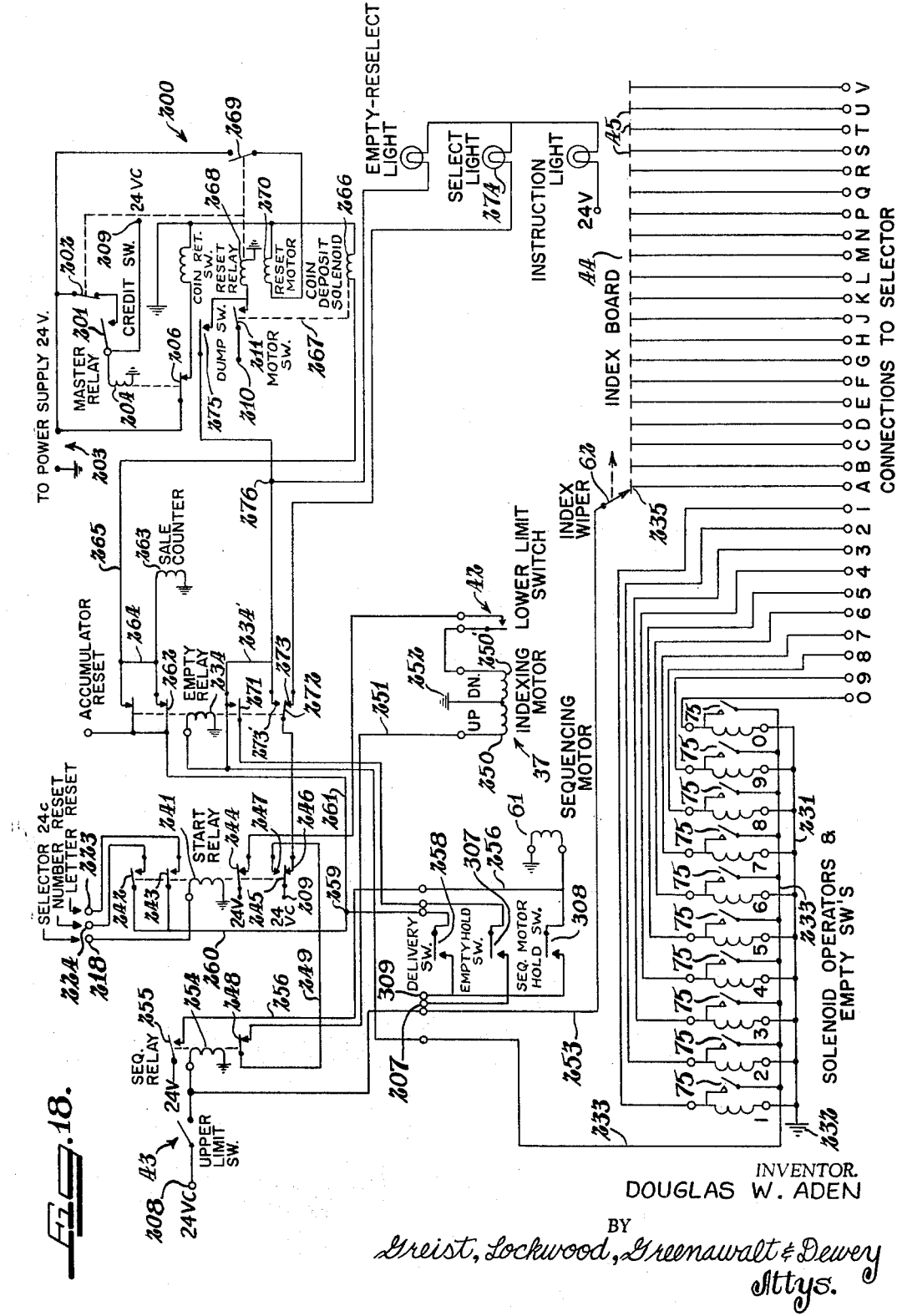

Aug. 9, 1966        D. W. ADEN        3,265,176
ARTICLE DISPENSER FOR SUSPENDED ARTICLES
Filed Oct. 17, 1963        9 Sheets-Sheet 8
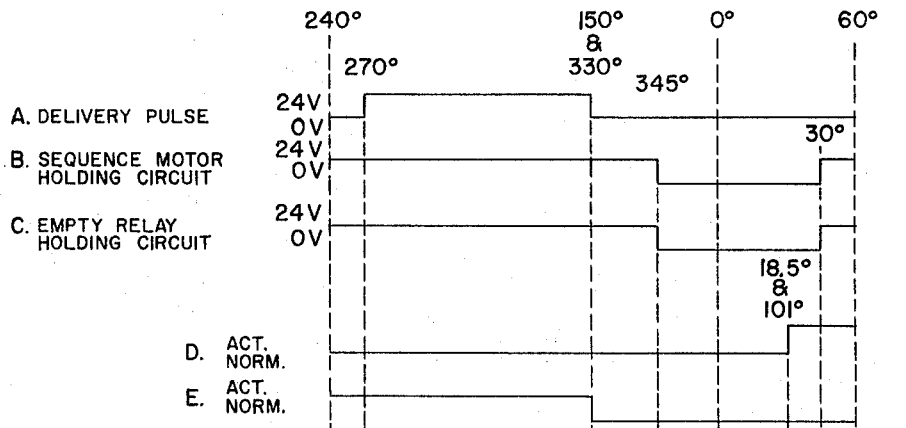
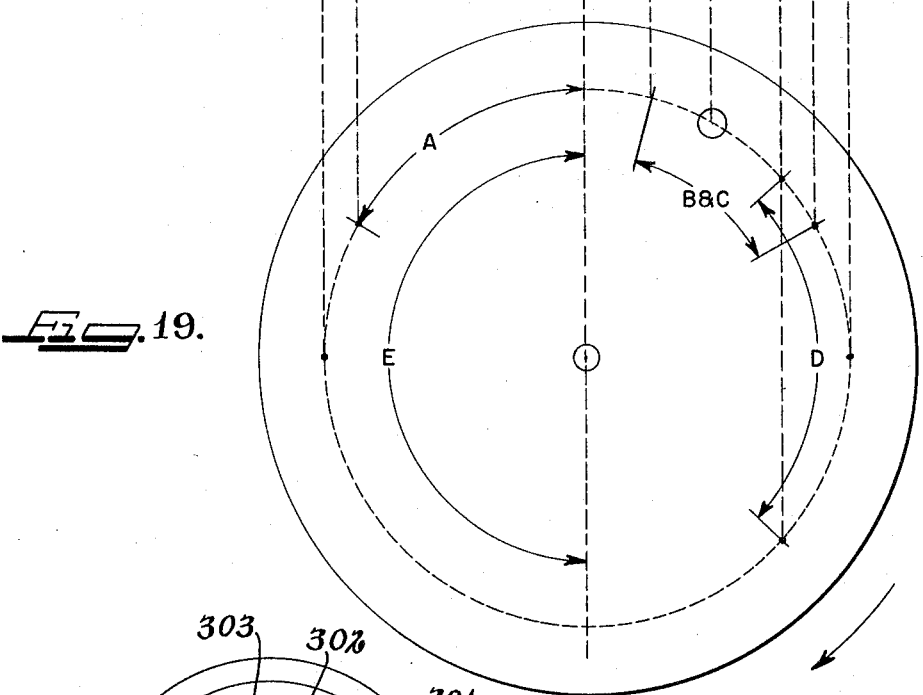
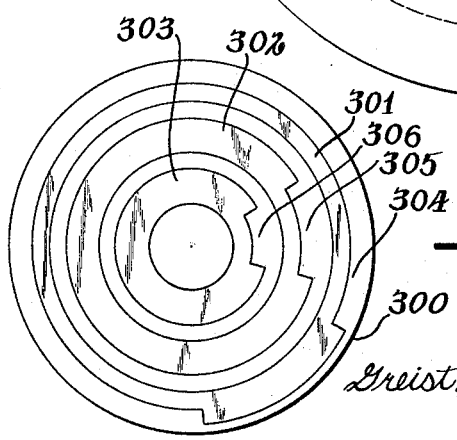
INVENTOR.
DOUGLAS W. ADEN
BY
Greist, Lockwood, Greenawalt & Dewey
Attys.

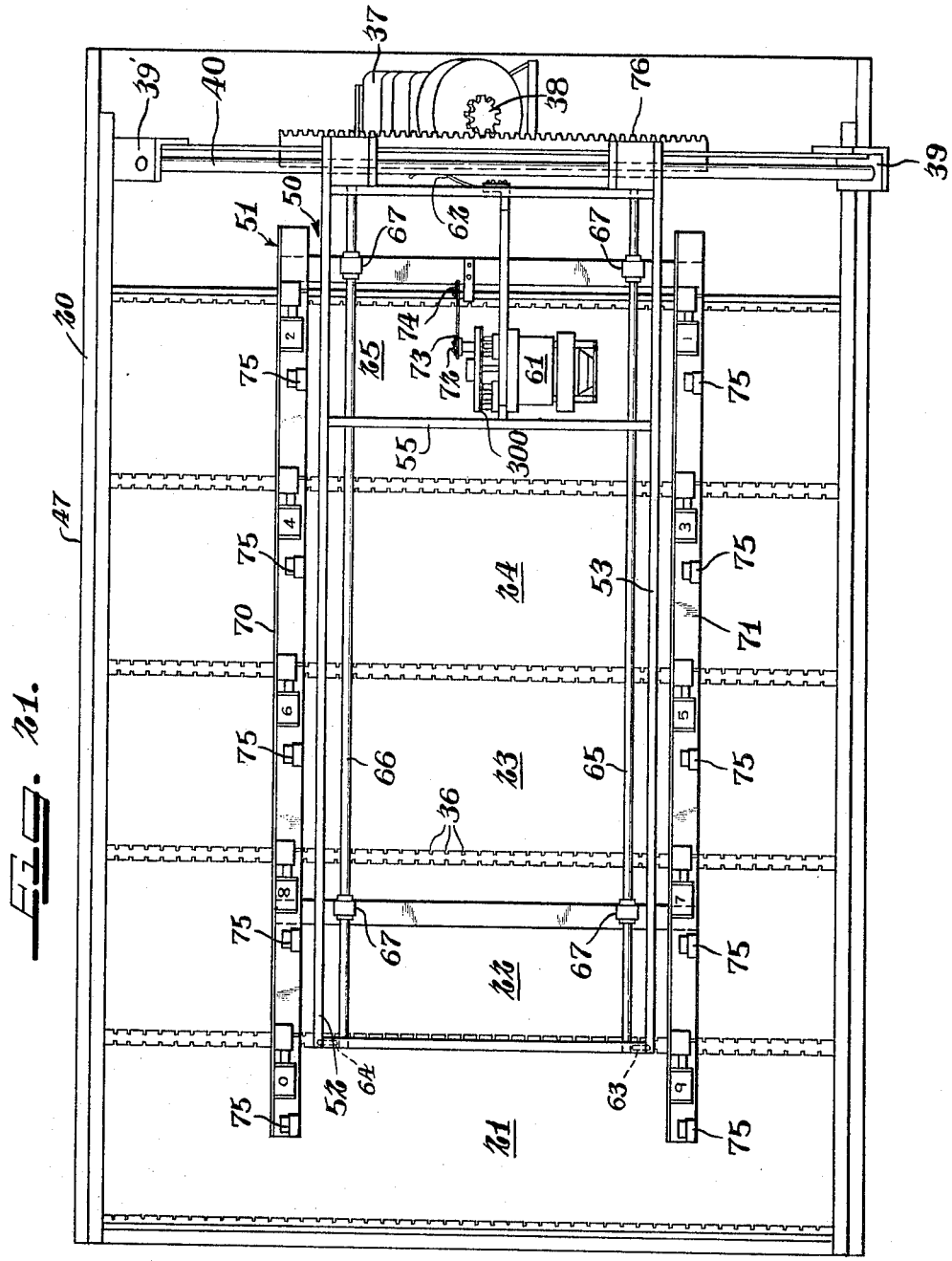

United States Patent Office 3,265,176
Patented August 9, 1966

3,265,176
ARTICLE DISPENSER FOR SUSPENDED ARTICLES
Douglas W. Aden, Harvey, Ill., assignor to Nedaco Inc., Blue Island, Ill., a corporation of Illinois
Filed Oct. 17, 1963, Ser. No. 317,869
32 Claims. (Cl. 194—2)

This invention relates to a coin operated article dispenser, and more specifically, is directed to a new and improved article dispenser particularly adapted to selectively dispense a wide selection of irregular objects such as greeting cards, nylon stockings and the like.

Coin operated vending machines account for a sizable share of retail sales, especially in the areas of cigarettes, candy, pocket combs and the like. One particular advantage common to such machines is that no retail clerk is required to perform the sale, nor do such machines require substantial amounts of servicing. Accordingly, machines may be positioned in various locations and serviced by one attendant, to provide a widespread merchandising system serving many consumers. The vending machine is always available to make sales at all hours of the day or night and keeps the saleable units protected from damage due to handling which ordinarily would render the same unsaleable. Vending machines also require a minimum amount of space and therefore may be strategically placed in those areas where a large number of people pass, for example, building corridors, train and bus stations, hotels, turnpike rest stops and the like. In the past, articles vended by a machine had to have substantial uniformity in the overall shape thereof due to the particular nature of the dispensing mechanism of the machine, and therefore articles of non-uniform configuration, while readily marketable through vending machines, were relegated to the ordinary retail store type of sale.

Until the present invention, it has been a problem to develop a coin operated article dispenser which would provide a wide variety of selections of non-uniform articles for the potential consumer, without such machine exceeding all reasonable limits insofar as physical dimensions and cost of manufacture are concerned.

The present invention is directed to a coin operated article dispenser which will hold a large number of selections for example, two hundred or more, with six or more units of each selection being available for sale. In one embodiment, the saleable unit of merchandise may be up to six inches wide and ten inches long due to the unique manner in which the articles are stored prior to the sale thereof. A customer examines an attached display in order to assist him in making a selection, and subsequently, upon depositing the proper amount of coin, depresses two buttons which cause the machine to scan the load and selectively deliver a single unit of the selected article in a matter of a few seconds. The mechanism to perform this function is quite uncomplicated and as expected reasonable from a cost standpoint. Coupled with this type of performance, the physical dimensions of the machine are comparable to coin operated vending machines which have found wide acceptance commercially.

It is therefore an object of this invention to provide a novel coin operated article dispenser of uncomplicated construction.

It is a further object of this invention to provide an article dispenser of simple design which will allow delivery of a wide selection of articles.

It is a further object of this invention to provide a coin operated article dispenser having novel means to deliver the selected article once selection is made.

It is a further object of this invention to provide a new and improved article dispenser having a novel interrogation system which will test to see if merchandise is available before effecting delivery to insure that the customer will receive value for his money.

It is a further object of this invention to provide an article dispenser having a novel dispenser assembly which is easily reloaded, while being dependable to dispense a single article at a time.

It is a further object of this invention to provide an article dispenser which is of uncomplicated construction which is sufficiently rugged to withstand the abuse normally given such machines.

It is a still further object of this invention to provide a novel circuit for an article dispenser which will safeguard against jackpotting of the machine and accepting coin unless delivery of the article is made while requiring a minimum number of operating components.

It is a still further object of this invention to provide a novel arrangement of dispenser assemblies having electromechanical means associated therewith to actuate a preselected one of said dispenser assemblies to deliver the article selected by the customer.

Further and fuller objects will become readily apparent when reference is made to the accompanying drawings wherein:

FIG. 1 is a perspective view of the article dispenser illustrating the cabinet to house the dispensing mechanism;

FIG. 2 is an enlarged front elevational of the article dispenser with the access lid in the open position and the carriage and saddle assembly removed;

FIG. 2a is an enlarged fragmentary side elevation of the article dispenser of FIG. 2 with portions cut away;

FIG. 3 is an enlarged fragmentary view taken along the lines 3—3 of FIG. 2 illustrating the means locking the access lid in the raised position;

FIG. 4 is a plan view of the support rack assembly in the cabinet, with the cabinet end portions removed and the front and back portions in section;

FIG. 5 is a view taken along 5—5 of FIG. 4;

FIG. 6 is a plan view of the carriage and saddle assembly removed from the support rack;

FIG. 7 is a view taken along the lines 7—7 of FIG. 6;

FIG. 8 is a front elevational view of the dispenser assembly with the dispenser blade being locked in the empty condition;

FIG. 9 is a front elevational view similar to FIG. 8 with the dispenser blade in the loading position;

FIG. 10 is an end elevational view of a loaded dispenser assembly with the support plate and loading barrel in cross section to illustrate the co-operation between the blade and barrel with the articles to be dispensed shown fragmentarily;

FIG. 11 is a free body plan view of the side of the dispenser blade which faces the barrel;

FIG. 12 is a view taken along the lines 12—12 of FIG. 11;

FIG. 13 is a schematic view of a loaded dispenser assembly with the articles to be dispensed shown fragmentarily;

FIG. 14 is a view similar to FIG. 13 illustrating a fragmentary portion of a solenoid operator in the initial stages of dispensing an article;

FIG. 15 is a view similar to FIG. 14 showing the completion of the dispensing step;

FIG. 16 is a block diagram indicating the sequence of operation of the article dispenser;

FIG. 17 is a schematic diagram of the push button switch assembly for making a selection;

FIG. 18 is a schematic diagram of the electrical circuit of the article dispenser;

FIG. 19 is a schematic diagram of the sequencing cycle;

FIG. 20 is a free body elevational view of the sequencing circuit board;

FIG. 21 is a plan view of the carriage and saddle assembly in the operative position overlying the storage rack with the sides of the cabinet removed; and FIG. 22 is an enlarged fragmentary elevational view of a portion of the storage rack holding a dispenser, with a fragmentary portion of the saddle assembly carrying the interrogation switch and latch solenoid shown in the operative relationship with respect to the storage rack and dispenser assembly.

The article dispenser about to be described will, for convenience of description and to effect a full understanding of the device, be explained in connection with the dispensing of greeting cards. It is to be understood however, that a wide variety of articles other than greeting cards should be dispensed, since uniformity in the shape and size of the article is not required due to the unique dispensing mechanism.

The cabinet 10 of FIGS. 1 and 2 contains the article dispensing mechanism, and is provided with a pair of upstanding side portions 11 and 12 joined by a solid back 47. A dispensing console 13 projects forwardly of the side portions 11 and 12 and is closed off at the upper extremity by a generally L-shaped lid 13' hinged as at 28 adjacent the upper extremity of the side portions 11 and 12. A delivery opening 15 is provided at the lower end of a delivery chute 15' shown in dotted lines in FIG. 2a.

The access lid 13' is provided with a flat back 27 which has a well portion 14 extending angularly therefrom. A light box 27' may be attached to the flat back of the access lid 13' to draw attention to the display of sample greeting cards 14' carried in the well 14. The greeting cards 14' may be encased in plastic and removably fixed in the well 14 by means of a rod accessible only from the underside of the access lid so as to prevent unauthorized removal therefrom. This manner of merchandising enables the potential customer to browse through the display and select a suitable greeting card to fulfill the desired need while protecting the saleable units from being rendered unsaleable by finger smudges, etc. The displayed greeting cards are marked with two indicia, such as a letter and number, to enable the customer to inform the machine of his precise selection. Three groups of manually depressable selector buttons 16, 17 and 18 are provided at waist level at the front of the console 13, with one group numerically marked and the other two groups marked with letters. After depositing the proper amount of coins the customer depresses one letter and one number button corresponding to the letter and number on the selected display card, and on such information, the machine will dispense the selected greeting card via the delivery chute 15' to the delivery opening 15.

The views of FIGS. 2 and 2a illustrate the access lid 13' raised to gain entry to the internal portion of the cabinet 10 to replenish the supply of cards carried on the storage rack 20, and will allow service personnel to make any other necessary servicing adjustments. In order to maintain the lid in the position shown, a locking mechanism 29 is provided on the underside of the access lid. The enlarged fragmentary view of FIG. 3 shows the locking mechanism 29 being provided with a crank member 30 having a pair of locking rods 31 and 32 pivotably attached to the crank, eccentric with respect to the crank pivot axis. Suitable guide brackets 33 and 34 are provided adjacent the ends of the guide rods to control the direction thereof when the crank 30 is turned to extend and retract the rods. When the access lid 13' is raised as illustrated in FIGS. 2 and 2a, the crank is rotated to the position shown in FIG. 3, so that the ends of the rods 31 and 32 overlie the upper end of the cabinet sides 11 and 12. The service attendant is then free to load the machine and effect any other necessary servicing functions.

The front elevational view of FIG. 2 and side view of FIG. 2a, are illustrated with the carriage and saddle assembly removed, in order to clearly depict the angular disposition of the storage rack 20. Such angular disposition allows the maximum size of commodity to be placed in the support rack while minimizing the over all height of the machine. More specifically, the spacing between the lower end of the articles and the delivery chute 15' is substantially uniform to insure proper delivery. On being released, the articles drop a sufficient distance to gain sufficient acceleration to slide down the chute with sufficient vertical clearance provided to prevent the article from getting hung up in the process.

The storage rack 20 is divided into a series of rectangular bays 21, 22, 23, 24 and 25 formed by the frame members 35. A series of opposed slots 36 are formed in the frame members along the side of the bays, being slightly spaced from each other and in transverse alignment with the spaced slots on the frame member on the opposite side of the bay for removably receiving a plurality of dispenser assemblies to be described.

The enlarged view of FIG. 4 is a top plan view of the storage rack 20 with the front 46, back 47 and side portions 11 and 12 of the cabinet in section. The slots 36 are again shown schematically by a series of lines, however the enlarged cross sectional view of FIG. 5 illustrates the slots 36 in the specific form as being a series of kerfs extending across the face of the frame member 35. All of the slots 36 in each bay are vertically disposed and transversely in line with the corresponding slots in adjacent bays. In the embodiment shown, each of the five bays is provided with 40 slots along each side thereof to accommodate 40 article dispenser assemblies per bay.

On the right hand end of the storage rack 20, a pair of angle brackets 39 and 39' are provided to carry a cylindrical guide rod 40. The rod 40 serves to provide a guide for the carriage and saddle assembly as it moves across the storage rack 20 as well as serving as a hinge pin to allow the carriage and saddle assembly to be pivoted out of the way when the access lid is open, in order to maximize the convenience in loading.

Disposed slightly to the right and below the guide rod 40, a brace member 41 is fastened to the brackets 39 and 39'. A printed circuit board 44 having a plurality of electrically conducting terminals 45 is affixed to the brace member 41 in a suitable manner to maintain the terminals in parallelism with the guide rod 40. Each of the terminals leads to a terminal lug for connection to the appropriate electrical leads.

The printed circuit board 44 shown has twenty terminals to correspond with each of the first and second 20 slots per bay. It is obvious that it is within the province of engineering skill to increase or reduce the number to correspond as a multiple of the selections available once the description of the instant invention is known.

A pair of mechanically actuated limit switches are also carried by the brace member 41 at opposite ends thereof for co-operation with limit switch actuators depending from the underside of the carriage. This function will be described more completely when a full description of the operation of the article dispenser is given.

An indexing motor 37 is carried at the right hand end of the storage rack 20, and has the casing thereof mounted by suitable conducting means such as metallic brackets or the like to provide a common ground with the frame 35. A power shaft 19 projects upwardly from the motor 37 above the frame 35 and carries a pinion gear 38 for co-operation with a rack toothed member on the carriage assembly which will be described below.

The carriage and saddle shown in FIGS. 6 and 7 includes a carriage indicated generally at 50 having a saddle assembly 51 carried thereby. The carriage 50 includes a pair of longitudinal frame members 52 and 53 connected at one end by a brace member 54. A transverse brace member 55 rigidifies the central section of the longitudinal framing members 52 and 53, with transverse brace member 56 completing the carriage framework. A rack member 57 is disposed at the right hand extremity of the carriage assembly, having a pair of guide bushings 58 and 59 adjacent thereto and disposed above the rack teeth 76. The guide bushings 58 and 59 are provided with coaxial bores to receive the guide and hinge pin member 40 on the support rack assembly of FIG. 4, and may be of any suitable variety such as ball bushing members or the like.

Transverse brace members 55 and 56 support a motor mounting bracket 60 therebetween which carries a sequencing motor 61. The transverse brace member 56 supports a bracket 62' and resilient wiper blade 62 carried thereby which is adapted to wipe across the terminals 45 on the printed circuit board 44 when the carriage and saddle assembly moves over the support rack 20. The left hand end of the carriage 50 is supported for movement across the storage rack 20 by a pair of guide wheels 63 and 64 which ride on the frame member 35 between the rows of slots 36. In the embodiment shown, the frame member dividing bays 21 and 22 serves as the wheel supporting means.

A pair of saddle guide rods 65 and 66 are carried by the transverse braces 54, 55 and 56 and extend generally parallel to the frame members 52 and 53 with the guide rods serving to support the saddle 51 for movement in the direction of the central axes of the rods 65 and 66. The saddle 51 has a pair of angled framing members 70 and 71 disposed outwardly of the carriage frame members 52 and 53. A pair of braces connect the angle members 70 and 71, and carry attached guide bushings 67 to receive the guide rods 65 and 66 with a sliding fit.

The sequencing motor 61 is mounted in a motor mount 60 carried by transverse braces 55 and 56, and is provided with a circular disk 83' carried by the power shaft. A raised boss 77 is eccentrically disposed with respect to the axis of rotation of the disk and is provided with a crank arm 73 pivotably attached thereto at one end 72, with the other end 74 attached in a like manner to the transverse brace 69 on the saddle 51. The disk 83' has printed circuit board 300 on the side thereof facing the sequencing motor with suitable conductors provided in the circuit board to co-operate with the wiping terminals 77, 78, 79, 80, 81 and 82 to perform switching functions. The precise switching function of the sequencing motor and its associated switching circuitry will be more completely explained below in conjunction with FIGS. 19 and 20, and on a full description of the operation of the device. From the standpoint of mechanical movement, rotation of the sequencing motor causes the saddle 51 to shift first to the right and then back to the left in a reciprocating pattern common to crank mechanisms.

The angled framing members 70 and 71 on the saddle 51 each carry five solenoids numbered consecutively 1–9 and zero (0), with each pair of the solenoids (i.e. 5 and 6) being in alignment on the respective angle members 70 and 71. Immediately to the left of each solenoid, a normally open interrogating switch 75 is provided, with the interrogating switch actuating arm 76 disposed below the supporting angle members 70 and 71 in a manner more evident in FIGS. 7 and 22. On shifting of the saddle, the actuating arm will engage an empty dispenser to close the switch contacts as will become apparent hereinafter.

As pointed out previously, the carriage and saddle assembly is supported on one end by the guide rod 40 which also serves as a pivot to allow the carriage and saddle to be swung away from the storage rack to facilitate servicing and refilling of the dispenser assemblies. When the support rack has been filled and the machine serviced, the carriage and saddle assembly 50 and 51 are swung to the position illustrated in the plan view of FIG. 21 so as to overlie the storage rack. In this position the rack teeth 76 are in meshing engagement with the pinion 38 so that rotation of the pinion 38 causes the carriage and saddle assembly to move from the front to the back of the storage rack and vice versa thereby to scan the load in order to actuate the selected dispenser assembly in a manner to be described. The guide wheels 63 and 64 serve to support the opposite end of the carriage and saddle assembly throughout this movement on the frame member 35 between the rows of slots.

As the carriage and saddle assembly moves from the front to back the wiper 62 is in wiping contact with conducting terminals 45 on index board 44, which as previously described is disposed below guide rod 40. In addition to the carriage and saddle shifting from front to back, the saddle assembly 51 may shift transversely of the carriage for purposes to become apparent. In the plan view of FIG. 21, the storage rack is illustrated without the dispenser assemblies in order to present a clear picture of the relationship of the scanning means (carriage and saddle assembly) to the storage rack 20.

The article dispenser assembly of FIG. 8 includes a support plate member 83, which as seen in FIG. 10 is generally L-shaped in cross section, having a flange 84 at the upper extremity thereof. A barrel extends outwardly from the main portion of the support plate 83, and is attached at one end to the support plate by suitable means, such as a rivet, bolt or the like. A free end portion indicated at 86 is provided at the opposite end to receive the articles to be dispensed, a pivot member 87 carries a dispenser blade 88, having a first portion 89 overlying the free end 86 of the barrel 85 and an actuating portion 90 which projects above the support plate 83 for engagement by a solenoid operator. A biasing spring 91 is coiled around the pivot member 87 and serves to continuously bias the dispenser blade 88 in a clockwise direction when viewed in the direction of the elevational view of FIG. 8.

The actuating portion 90 has a cutaway shoulder portion 92 disposed adjacent the pivot 87 which serves to co-operate with a stop member 93, pivotably carried on the flange member 84. The stop member 93 may be swung away, as seen in FIG. 9, to allow the dispenser blade to rotate to the position shown, in order to clear the free end of the barrel 85 to permit loading. In this position, the opposite end of the stop member projects outwardly of the flange to engage the first portion of the dispenser blade to maintain it in the position shown during the loading operation. The stop member 93 has a depending flange 94 which co-operates with the back side of the support plate 83 to limit the angular swing thereof.

The view of FIG. 8 illustrates the dispenser assembly as being in the empty condition; thus the dispenser blade 88 assumes the position shown and is retained thereby by a flat spring member 95 which has an outwardly extending tang 96 which co-operates with a cutaway shoulder 97 in the first portion 89 of the dispenser blade 88. In the cross sectional view of FIG. 10 a number of articles 98 are carried on the barrel member 85 illustrating a loaded condition and as a consequence, tang 96 on the spring 95 is held in spaced relation to the dispenser blade 88. The spring 95 serves to bias the individually packaged articles, shown fragmentarily at 98, outwardly into engagement with the back of the dispenser blade 88. The free end of the barrel 86 has a cutaway portion 99 serving as a tolerance slot to prevent an article from being hung up under close tolerance situations. A raised portion 100 is provided on the back side of the dispenser blade 88 projecting towards the free end of the barrel 86 but terminating short thereof. An abrupt shoulder 100' merges with a thin end section 102 in the first portion of the blade while the upper end of raised portion 100 slopes gradually to merge therewith. The first portion 89 of the dispenser blade 88 is of non-uniform thickness having a thin end section 102 which merges with a thickened portion 103 through a gentle incline. The particular function of this simple but unique construction will become evident hereinafter.

As seen in FIG. 9, each of the articles to be dispensed is packaged, for example, in a cellophane, plastic or like bag, being secured by a grommet 104 at the top thereof.

In order to load the dispenser assembly the stop member 93 is swung to the position shown in FIG. 9, being at a right angle to the support plate 83 thereby allowing the spring 91 to bias the dispenser blade 88 to the position shown. A series of articles or units of merchandise are then loaded over the free end of the barrel depressing bias spring 95. The dispenser blade is then moved to the position shown in FIG. 13, and the stop member 93 is swung to overlie the flange 84 and engage the cutaway shoulder 92 in the actuating portion 90 of the dispenser blade 88. The spring 95 serves to bias the articles 98 towards the free end of the barrel, however the first portion 89 of the dispenser blade 88 overlies the free end to prevent the articles from being ejected therefrom. The grommet on the outermost article will be outwardly of the free end of the barrel, however the raised portion 100 will prevent it from dropping off of the dispenser blade until the dispensing function is performed.

In order to dispense a single article, an operator arm 105, carried by any one solenoid 1–9 and 0, is moved into engagement with the portion 90 of the dispenser 88 which projects above the support plate 83 in the manner shown in FIG. 14. As the arm 105 exerts force on the actuating portion 90 of the dispenser blade 88, the biasing force of spring 91 is overcome, and the blade pivots in a counterclockwise direction with the result that the abrupt shoulder 100' on the raised portion 100 catches the grommet 104 on the outermost article to carry it past the free end of the barrel, and move it downwardly as shown at 98'. Simultaneously therewith, the portion of increased thickness 103 on the back of the dispenser blade moves over the free end of the barrel to prevent further articles from being ejected therefrom under the influence of the spring 95.

As seen in FIG. 15 when the operator arm 105 has moved the dispenser blade to the position shown, the cutaway portion 97 is disposed below the tang 96 on the spring 95. At this point, the gentle incline 101 allows the grommet to slide thereover and by the force of gravity the article drops from the dispenser blade to the chute 15' below where it will slide to the delivery opening. Upon the operator arm 105 stopping and subsequently reversing its movement, the first portion 90 of the dispenser blade under the influence of the biasing spring 91 will follow the operator arm 105 back to the position shown in FIG. 13 where the stop member 93 prevents further movement. At this time, spring 95 forces the next article adjacent the free end of the barrel 85 over the raised portion 100 on the dispenser blade to prepare it for the next dispensing cycle.

The gentle incline 101 allows the raised portion 100 to move to the center of the grommet on the next article since it will hold the grommet back over the barrel against the force of the spring 95 until centered thus precluding any possibility of it becoming jammed or hung up so as to be inoperative. In the event that the article dispensed was the last on the barrel, the outwardly projecting tang 96 on the spring 95 will engage the cutaway shoulder 97 when the dispenser blade 88 seeks to return under the force of the biasing spring 91, thereby holding the dispenser blade in the empty position shown in FIG. 8.

The support plate 83 is of sufficient length to have the ends thereof slidably received in the pairs of opposed slots 36 in each of the rectangular openings in the support rack assembly as seen in FIG. 22. It can be appreciated that for five rectangular bays it is necessary to provide forty dispenser assemblies for each of the five bays 21–25. Each of the dispenser assemblies can carry several units of merchandise thus making in excess of 1,000 items available with the number of different selections being 200 in the specific embodiment shown.

The fragmentary elevational view of FIG. 22 illustrates a dispenser assembly positioned in the support rack beneath side frame member 71 of the saddle (shown fragmentarily). Interrogation switch 75 with its depending actuator 76 is shown to the immediate left of the number 3 solenoid, while the operating arm 105' of the solenoid is illustrated in solid lines in the de-energized condition, and shown in dotted lines 105 in the energized condition. Side frame members 35 of the storage rack 20 receive the dispenser assembly support plate 83, with the flange 84 engaging the top of the frame members 35 to hold it in position. The dispenser blade 88 is illustrated in the loaded position holding articles 98 on the barrel (not shown). In operation, side frame member 71 shifts slightly to the right and then back to the left. The two distinct motions perform different functions. On the shift to the right interrogation switch actuator 76 will be engaged by the actuating portion 90 of the dispenser blade 88 if it is in the position shown in dotted lines at 90'. If a loaded condition exists, the blade will be in the position shown in solid lines at 90 and interrogation switch actuator 76 will not come into contact with the dispenser blade as it shifts to the right.

As the saddle side frame member 71 moves to the left, the number 3 solenoid has previously pulled the operator arm to the position illustrated in dotted lines at 105 and will engage the actuating portion 90 of the dispenser blade 88. The dispensing function will be performed in the manner described in conjunction with FIGS. 14 and 15. Throughout the dispensing function the plunger in the selected solenoid is bottomed to resist the forces transferred thereto through the operator 105 as it engages the dispenser blade serving to insure completion of the dispensing function once it is started. On the side frame member 71 shifting to the left after operator arm 105 has actuated the dispenser blade 88 and returned it to the position shown, the actuating arm 105 will be moved to the up position shown in solid lines 105' by a spring return (not shown) when the solenoid is de-energized.

The broad sequence of operation of the article dispenser will be described in connection with the block diagram of FIG. 16 which graphically illustrates the sequence of events which may occur when an article is purchased from the machine. The coin is deposited, as shown in the block in the upper left-hand corner of the diagram, which causes the select light to come on. The customer then makes the selection by depressing one letter selector button and one number selector button corresponding to the number and letter on the selected display card. Upon making the selection, the appropriate solenoid is energized and the index motor also, to drive the carriage towards the rear of the storage rack the appropriate distance where it stops, this function being represented by the "index" block.

At this time, the sequence motor is started to shift the saddle first towards the right, then back to the left and back to the right to the start position. During the first part of the sequence cycle, the saddle interrogates to see if the selected dispenser assembly has merchandise available for sale. Assuming a positive reply, indicated by the yes adjacent the interrogate block, the operator arm in the appropriate solenoid assembly engages the actuating portion of dispenser blade on the saddle shifting to the left to effect release of the selected article allowing it to drop in the delivery chute and slide to the delivery opening where the customer may assume possession. The coin is then deposited in a coin storage receptable, the sale counted, and the index motor energized in a reverse direction to restore the carriage and saddle to the front of the storage rack with a limit switch de-energizing the index motor when such condition is reached.

Assuming a negative response was given on the interrogate cycle, the machine restores partially, that is, the carriage and saddle return to the front of the storage rack through the reverse operation of the index motor and stops as described above. The selection is erased, and the selector buttons restored to the starting position to encourage the customer to select an alternate form of article. Further encouragement is given to the customer by the empty reselect light coming on thus indicating that his selection is no longer available in the machine and presenting him with two alternatives. He may either make an alternative selection, or if the alternative selection is not suitable to his desires, he merely depresses the coin return button to effect the return of his money, which causes the machine to completely restore to the original or starting position.

A more complete understanding of the specific electrical and mechanical functions occurring to effect the sequence of events set forth in the description of the block diagram of FIG. 16 will be had after a complete description of FIGS. 17 and 18.

The schematic diagram of FIG. 18 is illustrated with all components in the at rest position or condition assumed while awaiting a customer, with the carriage resting against the lower limit switch 42 to mechanically maintain it in the open or non-conducting condition shown. The coin receiving equipment used in the present article dispenser may utilize parts which are relatively standardized in the industry with the necessary and appropriate circuit changes shown in the schematic wiring diagram of FIG. 18 being required to adapt it to the present machine. The coin equipment portion indicated at 200 includes a normally open credit switch 201 serially connected to a suitable power supply 203 which, in the preferred embodiment, is of the order of 24 volts. The credit switch 201 may be actuated by any of the known varieties of actuators including weight responsive, dimensionally responsive, etc. types well known in the art.

Upon deposit of the proper amount of coin, the credit switch will close, completing the circuit therethrough to the master relay 204, as well as establishing a 24 volt control supply to other parts of the circuit indicated generally by the supply terminal 209. When the master relay 204 is energized, the supply to the crem equipment, as it is commonly called by those skilled in the art, is broken by the master relay mechanically opening (dotted lines) normally closed switch 206 in series with the power supply and crem equipment (coin responsive electromagnet) to de-energize the same. Accordingly, any further attempts to deposit coins will result in the coins bypassing the credit switch mechanism and falling into a coin return slot in a manner well known.

Supply terminal 209 is in conduction relationship with terminal 207 in the sequencing motor section as well as being connected to terminal 208 on one side of the normally open upper limit switch 43. In addition, the 24 volt control voltage available at terminal 209 is supplied through terminal 210 to the normally open upper dump switch 211, as well as to each of the input portions of the banks of manually operable selector buttons shown schematically in FIG. 17. For convenience, the input terminals bear the reference character 209 also, since they are common with the terminal 209 in the coin section 200.

The circuit shown in FIG. 17 is a schematic representation of the selector button groups 16, 17 and 18 described in conjunction with FIG. 1. Each group of selector buttons 16, 17 and 18 is shown as comprising two distinct banks of manually depressible buttons 225 and 226, 227 and 228, 229 and 230, respectively. Each of the selector buttons in one bank is connected by mechanical means to a corresponding button in the associated bank as indicated in a conventional manner by dotted lines. A mechanical interlock (not shown) is provided to prevent depression of more than one letter selector button and one numeral selector button at a time.

Each of the selector buttons function as an electrical switch to supply the 24 volts from terminal 209 in the coin section 200 to the selected terminal. For example, if selector button 212 is depressed, button 213 will also be depressed through the mechanical connection (indicated in dotted lines) and a mechanical lock will hold both down. The voltage at common terminal 209 will be supplied through the group of switches to switch 212 and then to conductor 215. In a similar fashion the second group of selector buttons 216, will supply the voltage appearing at common terminal 209 through selector button 213 to supply terminal "A." Each of the remaining groups of selector buttons function in an identical manner to supply voltage to the associated terminal so further description thereof will be withheld.

When conductor 215 is energized, power is supplied to the group 17 selector buttons through conductor 217. When one selector button in group 17 is depressed, then the 24 volts will appear at terminal 218. Obviously, with conductor 215 in the group 16 section and its counterpart 219 in the other letter selector group 18 being in series with the group 17 number selector buttons, until selection of one letter and one number is made (in any order) no voltage will appear at terminal 218 and the equipment will not commence operation.

The selector button latch solenoids 220, 221 and 222 are energized on voltage being applied to each of the banks 228 and 230 to insure that buttons are in the out position through a mechanical operator (not shown). Latch solenoids 220 and 221 service the selector buttons in letter groups 16 and 18, and solenoid 222 services those in the number group 17. Subsequently, when a letter and a number selection is made by depressing the appropriate selector buttons, the latch solenoids 220–222 are de-energized and will remain in that state until one of the following conditions occur: it is necessary to re-select; the coin has been returned; or a delivery has been made. Terminals 223 and 224 provide a secondary source of power through the associated conductors shown to actuate the latch solenoids on the occurrence of one of the above events. Power is supplied to the terminals 223 and 224 on occurrence of one of the above events from the circuit of FIG. 18. For ease of description and convenience, these terminals have been illustrated and referenced with identical numbers in both figures.

Each of the lettered terminals, A, B, C, etc. in FIG. 17 is electrically connected to the correspondingly lettered terminals in FIG. 18, which in turn lead to the terminals 45 on the printed circuit index board 44. The numbered terminals of FIG. 17 are electrically connected to the corresponding numbered terminals of FIG. 18, which in turn are connected to the correspondingly numbered solenoids and the adjacent interrogation switch 75 on the saddle 51. Each of the solenoids shown schematically in FIG. 18 has the other side thereof connected through a common conductor 231 to a common ground 232. One side of the normally open interrogation switches 75 is connected between the selector buttons and its associated solenoid, with the other side of the interrogation switches 75 leading to a common electrical conductor 233 to the coil of the empty relay 234 and then to ground.

A more complete understanding of the remaining portion of the circuit of FIG. 18 may be had in conjunction with a full description of the operation of the article dispenser. After the customer has noted the type of card to fulfill his need, he deposits the proper amount of coin which also may be indicated on the display card. Upon establishing proper credit, credit switch 201 closes thereby energizing the master relay 204 which in turn de-energizes the crem equipment to prevent acceptance of further coin. Simultaneously therewith, the 24 volt control voltage appears at each of the input terminals 209 of the banks of selector buttons illustrated in FIG. 17. Voltage and current supplied through the banks of selector buttons energizing the latch solenoids 220–222 to insure that the selector buttons are in the out or select position.

Assuming, for example, the card selected had been indicated by the letter A and the numeral 1, the customer would depress button 212, which due to the mechanical connection indicated in dotted lines, also causes button 213 to be depressed. Power would then be supplied through button 213, and terminal A to the terminal 235 on the index board 44. At this time the latch solenoid 220 is de-energized since its voltage and current supply is derived through bank 226 and 230. Voltage and current is supplied through common terminal 209 on bank 225, through the selector buttons in this bank to selector button 212 which has been depressed to be in conducting relationship with conductor 215. Terminal 236 is in conducting relationship with conductor 215 and supplies power to terminal 217 located in the front bank of selector buttons 227 in group 17.

When the number selection, in this example, button 237 (#1) is depressed, button 238 also is depressed to place conductor wire 239 in conducting relationship with common terminal 209 shown at the left hand portion of bank 228. Simultaneous therewith, power which is supplied from bank 225 through conductor 215, terminal 236 and through terminal 217 to selector button 237 will be conducted through selector button 237 and terminal 240 to place the applied voltage on terminal 218. Also the latch solenoid 222 will be de-energized while No. 1 solenoid on the saddle will be energized causing its operator arm 105 to be extended.

As seen in FIG. 18, terminal 218 is connected through the coil on start relay 241 to ground. Thus, when terminal 218 has electrical power available, start relay 241 is energized causing the mechanical connection indicated in dotted lines to move the stacked switches 242, 243 and 245 against their associated switch poles, while switch blade 244 is moved to the open position. Switch 245 being a double pole single throw is moved from terminal 246 into conducting relationship with terminal 247. As indicated, one side of switch 244 is connected to the 24 volt supply 203 while the 24 volt control voltage from the terminal 209 is supplied to one side of switch 245. Switch pole 247 of switch 245 is in conducting relationship with one side of a normally closed switch 248 through a conductor 249. Normally closed switch 248 has the other side connected to the field 250 of the indexing motor 37 through an appropriate electrical conductor 251 so that the 24 volt control voltage will be supplied to the field 250. The indexing motor 37 is the commonly reversible type having a double field 250 and 250' center tapped to ground 252. Field 250 is appropriately wound to cause the indexing motor 37 to rotate in the proper direction to drive the carriage and saddle assembly from the front to back of the storage rack through the meshing of pinion gear 38 with the rack teeth 76.

As the carriage progresses from front to back the wiper blade 62 wipes across the terminals 45 on the index board 44. Upon a voltage appearing at one terminal in this example terminal 235, power is supplied through the index wiper blade 62, through electrical conductor 253 through the coil of sequence relay 254 to ground. Thus, relay 254 is energized, mechanically opening normally closed switch 248 to break the circuit supplying the indexing motor 37 causing the carriage to stop. Simultaneously, normally open switch 255 is closed since it is operated by relay 254 also. One side of the switch 255 is connected to the 24 volt supply with the opposite side being connected through conductor 256 to the field of the sequencing motor 61 and then to ground.

At this point, the carriage assembly has moved across the rectangular bays a slight amount, and has stopped in this example, with the solenoid operators, carried by the framing members 71 and 70 on the saddle assembly 51, in line with the first and twenty-first rows of article dispensers carried in the support rack. Throughout this movement, all the operators of the solenoids 105 are disposed on one side of the actuating portion 90 of the dispenser blade 88 in each of the associated bays, while the actuating portion 76 of each of the interrogation switches 75 is on the opposite side of the actuating portion 90 of the dispenser blade 88 as seen in FIG. 22.

With the sequence motor now energized, the saddle assembly 51 moves slightly to the right to interrogate to determine if the selection is available. Assuming the dispenser assembly has the selected unit available for sale, the indexing motor 37 moves the saddle 51 to the left, with the result that the operator arm 105 of solenoid 1 will engage the dispenser blade in the manner described in connection with FIGS. 8–15 above, to cause one article to be released.

As the indexing motor is going through its rotational cycle, the saddle assembly moves first to the right, and then back to the left, returning to the initial position shown to perform the mechanical dispensing described above. Through 60° of this cycle the delivery switch 258 is closed causing the 24 volts available from terminal 309 to be fed through the delivery switch 258 to junction 259. The delivery switch 258, empty hold switch 307 and sequence motor hold switch 308 are rotary switches which are actuated by rotation of the indexing motor through rotation of circuit board 300 which is in wiping contact with terminals 77 through 82. The precise switching function performed by this mechanical operation will be explained more fully in the description of FIGS. 19 and 20.

One side of junction 259 supplies voltage from the delivery switch 258 through conductor 260 back through switches 243 and 244 (which have been described previously as being in the closed position through the action of the start relay) back through the number and letter selector button reset solenoids 220–222 via terminals 223 and 224, thus causing the selector buttons to return to the out position with the resultant de-energizing of the start relay 241. This would normally cause the sequence motor to stop since its voltage supply is derived from the selector buttons via the wiper 45, however the sequence motor hold switch 308 has been closed prior thereto and will remain closed to allow completion of the cycle.

The other side of junction 259 is connected through conductor 261 through normally closed switch 262 through a sale counter relay 263 to ground. The sale counter relay, when energized, records the sale, while simultaneously the 24 volts available through switch 262 is supplied through branch 264, conductor 265, to the coin deposit solenoid 266 to energize the same. The dotted lines 267 illustrate the mechanical connection between the coin deposit solenoid 266 and dump switch 211 so that dump switch 211 is closed only on the energization of coin deposit solenoid 266. Closing of switch 211 applies 24 volts through the coil of reset relay 268 to ground thereby actuating normally closed switch 202 to the open position to de-energize the credit switch circuit, and simultaneously closing normally open switch 269 to start the reset motor. Through the opening of switch 202, the master relay is de-energized with the attendant opening of switch 206 which serves to de-energize the crem equipment. Reset motor 270 recycles the coin equipment to prepare it for reception of further coins in anticipation of the next sale.

Assuming that the selection A–1 was empty, the dispenser blade 88 would be locked in the position shown in FIG. 8 and at 90' in FIG. 22. Under this assumption, the electrical and mechanical operation would occur as described above, up to and including the energizing of the sequence motor.

As described above, the energization of the sequence motor causes the saddle to shift first to the right and then back to the left. If the actuating portion 90 of dispenser blade 88 is in the empty condition as shown at 90', FIG. 22, the actuating portion 76 on the interrogation switch 75 engages the actuating portion 90' on the dispenser blade 88 to mechanically close switch 75 adjacent latch solenoid 1. The 24 volts to the coil of latch solenoid 1 would be supplied through now closed switch 75, conductor 233 through the coil of empty relay 234 to ground. Empty hold switch 307 will be closed to provide a holding circuit through normally open switch 271 to maintain the empty relay 234 energized when the switch 75 is biased open as the saddle shifts from the extreme right to the left.

Empty relay 234 on being energized, mechanically closes normally open switch 271, and moves the single throw double pole switch 272 from pole 273 to pole 273' de-energizing the select light 274 while energizing the coin return switch 275 by applying a voltage to junction 276 from pole 273'. When the voltage appears at junction 276, the empty reselect light will come on to inform the customer that the particular selection is not available and he should either reselect or depress the coin return button represented by coin switch 275 to obtain return of his money.

On closing coin return switch 275, reset relay 268 is energized to remove voltage from the credit switch, while returning the coin and energizing the reset motor 270 to restore the coin equipment to the starting condition. In the meantime, the sequence motor has completed its normal cycle, however the effect of the delivery pulse is nullified insofar as counting the sale and depositing the coin, by the empty relay 234 opening switch 262, and accordingly no sale will be counted. The start relay will also be de-energized and the empty reselect light remains lighted while sequencing motor is returning to the initial position. On the sequencing motor arriving at the completion of its normal cycle, the carriage will move to the starting position since power will be available through normally closed switch 244, limit switch 42 (which is also normally closed when the carriage is not against the lower limit), through the reverse or "down" field winding 250' of the indexing motor 37 to ground 252. The carriage will be driven to the front of the machine, at which time it engages limit switch 42 causing it to open to de-energize the system.

If the coin return switch 275 has not been actuated, the customer's credit remains, holding the credit switch closed and the coin is held in escrow. Also, the latch solenoids 220–222 have been energized to restore the selector buttons to the initial condition in order to encourage the customer to make a new selection, in which event the sequence of operations will occur as described in connection with a loaded dispenser.

The operation of the novel delivery switch 258, empty hold switch 307 and sequence motor hold switch 308 will now be explained with reference to FIGS. 19 and 20. The printed circuit board which is carried on the rear side of the disk 83 is shown at 300 in FIG. 19. Three separate conducting sections are provided being indicated at 301, 302, and 303. One of each of the wiping terminals 77, 78 and 79 carried on the indexing motor 61 will be in electrical wiping contact with the inner peripheral portion of the conducting rings 301, 302, and 303 which have outer peripheral portions angularly interrupted as shown at 304, 305 and 306 respectively. Wiping terminals 80, 81 and 82 co-operate with the outer peripheral portions of the rings 303, 302 and 301 respectively so that when a pair of terminals engage the conducting portion of the ring an electrical conducting path is presented from one terminal to an associated terminal. Each pair of terminals represents one side of the switch while its associated blade is represented by the conducting portions. Thus, during certain periods of rotation the terminals will be in conducting relationship through the associated conducting ring to perform the switching functions attributed to each in the description above.

The specific details of the operation of these switches will now be given. Outer conducting ring 301 performs the delivery switching function with the delivery switch shown schematically at 258 in FIG. 18. This switch remains closed through an angular period of 60°. This is more clearly apparent when reference is made to FIG. 19, wherein zero voltage is applied through the delivery pulse switch, except between 270° and 330° of the rotational cycle at which time the delivery switch 258 is closed applying the 24 volts to the junction 259 as described above.

The middle conducting ring 302 represents the blade of the sequence holding circuit which, when closed, delivers the 24 volts from the power supply via terminal 209, to the sequencing motor to insure continued operation from 30° angular rotation to 345° angular rotation. Inertia of the system will return the saddle the final 15° to the normal or start position. This insures that once the sequence motor is started, even though the sequence relay is subsequently de-energized, the sequence motor will cycle through to completion, causing the saddle to translate to the right as it interrogates for an empty condition and then to its full left after which it restores to the intermediate position. In addition, should the main power supply to the machine be interrupted at any time during the cycle, when power is restored, the sequence motor will complete its cycle to restore the saddle to the normal or start position on the carriage. It is absolutely necessary to maintain the saddle in the normal or start position during the reverse indexing cycle in order that the carriage may return to the front of the storage rack without the limit switch actuators 75 or operators 105 engaging the upwardly projecting actuating portion 90 of the dispenser blades.

The inner conducting ring 303, representing the empty hold switch is, energized after angular rotation of 30° has occurred, which serves to apply voltage and current through empty hold switch 307 to normally open switch 271, controlled by the empty relay 234. Empty hold switch 307 remains closed as circuit board is rotated through 345°, at which time one of the wipers intersect the angularly interrupted portion 306 on the outer periphery of the conducting ring 303, de-energizing the empty hold switch for the last 15° of rotation. With the delivery pulse having occurred prior to opening of the empty relay holding switch, the selectors have been reset and start relay 241 de-energized causing switch 245 to move against pole 246 to make the 24 volt control voltage available through switch 272, which is held against pole 273' by the empty relay 234 being energized, to the empty relay 234 via branch lines 234'. This will maintain the empty relay energized through the last 15° of the sequence cycle keeping the empty reselect light on while the carriage is restoring to the "start" position. Unless the empty relay 234 has been energized, closing of the empty hold switch 307 will have no effect since switch 271 in series with the empty relay and empty hold switch 307 will remain open.

The angular indicia labeled D and E in the graph of FIG. 19 represents the mechanical action which occurs upon rotation of the circuit board. Graph D illustrates the mechanical action of empty interrogate switch to determine if an empty condition exists, with interrogation occurring between 18.5 and 60° of angular movement, while the dispenser actuation takes place through a full 180° rotation thereafter as seen in the graphic representation E.

It is to be appreciated that any combination of a single letter and number will direct the machine to the proper position to actuate the appropriate dispenser assembly to release the particular selection chosen from the display rack. In the present case, twenty letters and ten numbers have been shown which provide two hundred available combinations of letters and numbers to provide two hundred different selections. Accordingly, two hundred separate dispenser assemblies will be required. It is readily apparent to those skilled in the art that this number may be expanded or reduced with only the exercise of engineering skill required.

In the present case, two hundred dispensers are loaded in the support rack and the carriage and saddle assembly are pivoted to the position shown in FIG. 21. The access lid is then closed and the machine is ready for operation. In order that the carriage and saddle be directed to dispense the proper item from the appropriate rectangular bay, each bay is identifiable by coordinates such as a number and letter of the alphabet. The letter coordinate controls the movement of the carriage and saddle assembly from front to back through the placing of a voltage on the terminal board 44. As described above, when this voltage is detected, the carriage stops and the saddle assembly translates first to the right and then to the left. The number coordinate has previously energized a particular solenoid bearing an identical number, as well as making power available to one side of the normally open interrogate switch 75. As explained above, the operator of the energized solenoid will actuate the dispenser assembly to release the selected article during the latter period of saddle translation, if an empty condition has not been detected.

Under these conditions, any particular dispenser assembly in a given location in one of the rectangular bays may be identified by selection of one letter coordinate and one number coordinate. As explained previously, mechanical means well known in the art is provided to prevent the selection of more than one letter or number at a time, and in addition the circuit is wired so that the machine will not begin operation until such time as two coordinates have been selected (i.e. two selector buttons have been depressed).

In vending machines it is necessary to preserve the faith of the public in the operativeness of the machine, that is, suitable means must be provided to insure that the coins deposited by the customer will be available for return in the event of machine failure, and/or unavailability of the selection. In the present dispenser the operating circuit is unique in that it protects against the coin being deposited until delivery has occurred, as described above. An additional feature to supplement the protection provided by the unique circuit includes the provision of the second limit switch 43 alluded to briefly above.

As shown in FIG. 5 the limit switch 43 is provided at the rear of the storage rack and is adapted to be engaged by the underside of the carriage assembly should the indexing motor fail to stop at the selected terminal. Normally, the wiper 45 will detect a voltage on the index board 44 to de-energize the indexing motor, however, should the wiper fail to do this, the indexing motor will drive the carriage and saddle assembly up against normally opened limit switch 43 causing it to close by means of incline mechanical actuator depending from the underside of the carriage. The actuator comprises a plate affixed to the underside of the carriage having upwardly sloping surfaces at the ends thereof which will mechanically operate each of the limit switches 42 and 43 when the carriage is at the extreme front or back of the storage rack.

As seen in FIG. 18 the 24 volt control voltage is available at terminal 208 to limit switch 43. When the limit switch 43 is moved to the closed position through the actuator on the carriage engaging it, the 24 volt control voltage is supplied therethrough to the sequence relay, which causes the indexing motor 37 to be de-energized and the sequence motor to be energized to translate the saddle first to the right and then to the left. A permanent finger (not shown) is carried on the rear of the storage rack in the appropriate position to engage actuator arm 76 of the interrogate switch 75 adjacent the latch solenoid 2 on the frame member 70 of the saddle assembly 51. This will cause the sequence cycle to continue in the manner described above as if an empty dispenser condition existed. Accordingly, on the sequence motor completing its cycle, the index motor returns the carriage to the front of the machine while the customer's credit remains available for return, or at his option permits him to reselect. It is to be emphasized that the upper limit switch only guards against the contingency of machine failure and accordingly is not normally actuated. It presents an additional safeguard against the customer losing his coin unless the selected article has been delivered.

The article dispenser of the present invention has been described as being coin operated, however it is to be understood that the unique mechanism could be used for remote storage and material handling with suitable conveying means to bring the dispensed article to the desired location. For example, the dispensing assembly and means to selectively actuate the same could be placed on an upper floor of an establishment with the controls on the main floor. Delivery chutes, conveying belts and the like could be used to deliver the selected article to the main floor. Obviously, many other uses of the unique dispensing assembly could be made which are far too numerous to mention.

While a single illustrative embodiment has been discussed in the foregoing description and disclosed in the appended drawings, it will be immediately apparent to the skilled artisan that a number of modifications could be made without departing from the true spirit and scope of the invention. It is therefore desired that any limitations imposed be within the spirit and scope of the following claims.

I claim:

1. An article dispenser comprising a cabinet housing a storage rack therein, a plurality of groups of articles arranged in juxtaposed rows in said storage rack with each group being supported by a dispenser assembly means, chute means below said storage rack communicating with a delivery opening in said cabinet, a carriage positioned above said rack and movable between first and second limits, first means responsive to the combination of a letter and number selection to drive said carriage to a preselected position between said first and second limits, saddle means supported by said carriage, said saddle means having means connected thereto to move said saddle means transversely of said carriage a predetermined amount when said carriage has reached said preselected position, and second means on said saddle responsive to one of said letter and number selections to engage the delivery means of the group identified by the letter and number selection and thereby release one unit of said selected group of articles into said chute means.

2. The article dispenser of claim 1 wherein interrogation means is carried by said carriage, said interrogation means detecting an empty condition in the selected group and responding thereto by energizing an indicating means.

3. The article dispenser of claim 1 wherein said delivery means comprises a support plate removably received in said storage rack, a barrel projecting from said plate and adapted to hold one of said groups of articles, a pivoting dispenser blade having a first portion overlying said barrel to hold said articles thereon with a second portion of said dispenser extending above said support plate, said second portion being engageable with said second means on said saddle responsive to said letter and number selection to rotate said dispenser blade and dispense one unit of said group of articles.

4. The article dispenser of claim 3 wherein the second portion on said dispenser blade for engagement by an interrogation means carried by said carriage when an empty condition exists on said barrel, and including means responsive to actuation of said interrogation means to indicate said empty condition.

5. An article dispenser comprising a storage rack, a plurarity of dispenser assemblies mounted in said storage rack, a group of articles carried by each of said dispenser assemblies, scanning means to scan said storage rack, said scanning means being movable over the storage rack along two paths disposed at right angles to each other, said scanning means being movable along one of said paths in first and second directions, said scanning mean moving in said first direction to scan said group of articles to determine if the selected one of said articles is available for sale on the selected one of said dispenser assemblies, said scanning mean then being movable in a second direction to engage the selected one of said dispenser assemblies to release a single article from the group of articles carried by the selected one of said dispenser assemblies.

6. An article dispenser comprising a storage rack, a plurality of dispenser assemblies mounted in said storage rack, a group of articles carried by each of said dispenser assemblies, scanning means to scan said storage rack and selectively to actuate a preselected one of said dispenser assemblies in said storage rack thereby to release a single article from said group carried thereby, said scanning means to actuate a preselected one of said dispensing assemblies including a plurality of manually operable selector buttons having electrical contacts associated therewith, a carriage and saddle assembly positioned over said dispenser assemblies and movable relative thereto, indexing means responsive to depression of two of said selector buttons to cause relative movement between said carriage and saddle assembly and said cabinet, means to stop carriage at a position selected by one of said buttons, and simultaneously therewith energize a sequence motor operatively connected to said saddle assembly, said sequence motor shifting said saddle assembly relative to said storage rack, and means on said saddle assembly responsive to the actuation of the other of said buttons to engage the dispensing assembly of the selected group to release said single article when said saddle assembly is moved by said sequence motor.

7. A coin operated article dispenser comprising a storage rack having a plurality of juxtaposed rectangular openings, a plurality of opposed slots along each of the long sides of the rectangular openings, a plurality of dispenser assemblies positioned in each of said rectangular openings, a carriage overlying said storage rack and being movable with respect thereto in a direction parallel to the long side of said rectangular openings between first and second limits, a saddle member supported by said carriage for movement at right angles with respect to said carriage movement, first and second groups of manually operable selector switch means, one switch means of said first group and one switch means of said second group indicating which dispenser assembly is to be actuated, credit circuit means controlling the power to said first and second groups of switch means, index motor means energized by the closing of one of each of said first and second groups of switch means when said credit circuit is energized, said index motor means driving said carriage between said first and second limits, first sensing circuit means associated with said carriage to detect which switch means of said first group has been selectively energized and stop said carriage at a preselected position between said first and second limits and simultaneous therewith energize a sequencing motor, means operatively connecting said sequencing motor to said saddle member to shift said saddle transversely of said carriage movement, and means on said saddle member responsive to the selection of one of said selector switch means of said second group to actuate the selected dispenser assembly on said saddle movement thereby to deliver a single article carried thereby.

8. The coin operated article dispenser of claim 7 wherein interrogation means is provided on said saddle member, said interrogation means being actuated when an empty condition exists in said dispenser assembly and means to indicate said empty condition while said carriage is restoring to said first limit.

9. The coin operated article dispenser of claim 7 wherein each of said dispenser assemblies comprises a support plate removably received in said storage rack, a barrel projecting from said support plate and being adapted to hold a plurality of articles, resilient means biasing said articles towards the free end of said barrel, a dispenser blade having a first portion overlying the free end of said barrel, a second portion on said blade extending above said support plate and engageable by said means on said saddle to actuate said dispenser assembly when said barrel has at least one article thereon, means on said first portion of said dispenser blade cooperating with the free end of said barrel, to eject one article from said barrel while retaining the other articles thereon when engaged by said means on said saddle responsive to one of said selector switches.

10. The coin operated dispenser of claim 7 wherein said first sensing circuit means includes a conducting wiper blade carried by said carriage and slidably cooperating with a printed circuit board electrically connected to said first group of switches.

11. A coin operated article dispenser comprising a cabinet having a storage rack therein, a plurality of article dispensing means in rows in said storage rack, each of said article dispensing means being identifiable by a system of two coordinates, a first and second group of manually operable selector buttons having switch means associated therewith, indicia means associated with said selector buttons to permit selection of a pair of coordinates, a carriage member overlying said storage rack, a saddle member movably carried by said carriage, a plurality of actuating means on said saddle member to engage one of said dispensing means, index motor means driving said carriage and saddle members over said storage rack, said index motor means being energized in response to actuation of one selector button in each of said first and second groups, sensing means for stopping said carriage and said actuating means on said saddle in substantial alignment with a selected one of said rows identified by a coordinate corresponding to the selected selector button in one of said groups, sequence motor means responsive to said stopping of said carriage member to move said saddle member transversely of said carriage member to bring a elected one of said actuating means into engagement with said article dispensing means to release one article carried thereby, said selected one of said actuating means corresponding to one coordinate selected by the previous actuation of one selector button in the other of said groups whereby the article selected will be dispensed.

12. The coin operated article dispenser of claim 11 wherein credit means is provided, said credit means controlling the electrical power to said switches associated with first and second groups of manually operable selector buttons.

13. The coin operated dispenser of claim 11 wherein said sensing means includes an electrically conducting wiper on said carriage member in sliding engagement with a circuit board, said circuit board having a plurality of spaced terminals thereon, each terminal corresponding to one of said selector buttons in said first group, and circuit means in conducting relationship to said wiper and being responsive to a voltage at one of said terminals to de-energize said indexing motor.

14. The coin operated article dispenser of claim 11 wherein said dispensing means includes a support plate having opposite ends thereof disposed in said storage rack, a barrel projecting from said plate and terminating in a free end, a plurality of articles on said barrel, spring means biasing said articles towards the free end of said barrel, a pivotable dispenser blade having a first portion overlying said free end of said barrel, a second portion of said dispenser blade projecting above said support plate and adapted to be engaged by one of said actuating means on said saddle member when said saddle member is moved transversely of said carriage member, and means on said first portion of said dispenser blade responsive to actuation by said actuating means to release one of said articles from said barrel while retaining the other thereon.

15. A dispenser assembly means for use with a coin operated article dispenser comprising a support means, a barrel supported by said support means and projecting therefrom to terminate in a free end portion, said barrel having a plurality of articles carried thereby, means to suspend said articles from said barrel for free sliding movement therealong, a dispenser blade pivotably carried by said support means, a first portion on said blade overlying said free end of said barrel, and means on said dispenser blade cooperating with the free end of said barrel to eject one article therefrom, said dispenser blade being of sufficient dimension to overlie the free end of said barrel during dispensing to retain the remaining articles on said barrel.

16. A dispenser assembly means for use with a coin operated article dispenser comprising a support means, a barrel supported by said support means and projecting therefrom to terminate in a free end portion, said barrel having a plurality of articles carried thereby, means to suspend said articles from said barrel for free sliding movement therealong, a dispenser blade pivotably carried by said support means, a first portion on said blade overlying said free end of said barrel, means on said dispenser blade cooperating with the free end of said barrel to eject one article therefrom while retaining the remaining articles on said barrel, spring means operative to urge said dispenser blade in a clockwise direction when viewed facing the free end of said barrel, and releasable stop means on said support means to limit the clockwise rotation to insure said first portion partially covers said free end of said barrel when articles are thereon.

17. The dispenser assembly means of claim 15 wherein resilient means is provided to bias said articles towards the free end of said barrel.

18. The dispenser assembly means of claim 17 wherein said resilient means is provided with a detent to engage said first portion of said dispenser blade as the last article is dispensed to hold said dispener blade againt the force of a spring biasing said blade in an opposite direction.

19. The dispenser assembly of claim 15 wherein said means on said dispenser blade cooperating with the free end of said barrel includes a raised portion on the side of said dispenser blade overlying said barrel, said raised portion merging with the remainder of the surface on said side through a gentle incline to allow a free release of said articles when said blade is pivoted.

20. A dispenser assembly means for use with a coin operated article dispenser comprising a support plate adapted to be removably carried by a support rack, a barrel supported by said support plate and projecting therefrom to terminate in a free end portion, said barrel having a plurality of articles carried thereby, a dispenser blade pivotably carried by said support plate, a first portion on said blade overlying said free end of said barrel, a second portion on said dispenser blade having a part thereof projecting above said support plate, and said first portion being of lesser thickness than said second portion whereby rotation of said blade will bring said second portion into closer proximity with said free end of said barrel than said first portion to dispense one article while retaining others on said barrel.

21. The dispenser assembly means of claim 20 wherein a raised portion is provided on said first portion on the side facing said barrel, said raised portion merging with said first portion through a gentle incline in the direction of said second portion to allow free release of said article.

22. A coin operated dispenser comprising a storage rack, a plurality of article dispenser assemblies carried by said rack, a carriage and saddle assembly overlying said storage rack and being mounted so as to be movable with respect thereto, first and second groups of selector button means allowing automatic selection of an article from one of said dispenser assemblies, said first group of selector button means having a circuit means leading therefrom to a plurality of spaced terminals fixed with respect to said rack, index motor means responsive to actuation of one of each of said first and second selector buttons to move said carriage and saddle assembly across said storage rack between first and second limits, sensing means cooperating with said terminals to stop said carriage and saddle assembly between said first and second limits, circuit means associated with said sensing means starting a sequence motor means to move said saddle relative to said rack, and means on said saddle energized by one of said selector buttons to engage said selected dispenser to release one of said articles during said saddle movement.

23. The coin operated article dispensed of claim 22 wherein interrogation switch means is carried by said saddle, said interrogation switch means having circuit means associated therewith to indicate existence of an empty condition and restore said carriage and saddle assemblies to permit reselection while maintaining the customer's credit in escrow.

24. The coin operated article dispenser of claim 22 wherein a switch means is operated by said sequence motor to actuate start circuit means to return said selector buttons to the starting condition after delivery of said article has been effected, said start circuit means supplying power to said indexing motor in a reverse direction to restore said carriage and saddle assembly to the front of said storage rack.

25. An article dispenser comprising a storage rack, a plurality of dispenser assemblies carried by said storage rack, each of said dispenser assemblies adapted to carry a plurality of articles, dispenser blade means on each of said dispenser assemblies adapted to maintain said articles thereon in a releasable manner, scanning means movable relative to said storage rack, said scanning means having a plurality of electrically actuated operator arms thereon to engage one of said dispenser blade means when extended, and circuit means to extend a selected one of said operator arms to engage said dispenser blade on a selected one of said dispenser assemblies to effect release of one of said article therefrom during movement of said scanning means.

26. The article dispenser of claim 25 wherein means is provided to detect an empty condition in the selected dispenser and respond thereto by energizing an indicating means while restoring said scanning means to a starting position.

27. A coin operated article dispenser comprising a storage rack, a plurality of dispenser assemblies carried by said storage rack, each of said dispenser assemblies having a projecting barrel adapted to hold a plurality of articles thereon, said barrel terminating in a free end portion, a dispenser blade having a first portion thereof rotatable to a position over the free end portion of said barrel and locking means to maintain it so disposed, an actuating portion on said dispenser blade projecting above said barrel, said actuating portion on each of said dispenser assemblies being in substantial alignment with adjacent dispenser assemblies and means to scan said plurality of dispenser assemblies and engage the actuating portion of a preselected one of said dispenser assemblies to effect release of a selected one of said articles while maintaining the remaining articles on said barrel.

28. A dispenser assembly adapted to be easily loaded with a plurality of dispensable articles comprising a support plate, a barrel projecting from said support plate and terminating in a free end portion, a dispenser blade pivotably mounted on said support plate and having a first portion thereof rotatable to a position to overlie said free end portion of said barrel, spring means urging said dispenser blade to rotate so as to expose the free end of said barrel and pivotable stop means having a portion thereof engaging an edge of said first portion of said dispenser blade to limit the rotation thereof whereby dispensable articles may be placed over the exposed free end of said barrel.

29. A control circuit for directing a scanning object to a preselected position between first and second limits and thereafter moving a portion of said object transversely of the movement between first and second limits comprising selector means electrically coupled to a power source, index motor means electrically connected to said selector means to drive said scanning object, sensing means to terminate electrical power to said index motor means at a position between said first and second limits thereby stopping said scanning object, said position being determined by actuation of one of said selector means, and circuit means responsive to the stopping of said index motor means to energize a sequence motor means to shift a portion of said scanning object transversely of the direction of movement between said first and second limits.

30. The control circuit of claim 29 wherein a plurality of operator arm means are carried by said portion of said scanning object, and solenoid means is provided to extend a selected one of said operator arm means in response to actuation of one of said selector means.

31. A control circuit for use with a coin operated article dispenser comprising a power supply credit switch means in series with said power supply, a master relay in series with said credit switch means and having the output side connected to two groups of selectors containing a plurality of selector button switch means, one of said groups being in series with the other of said groups when one selector button switch means in each group has been actuated to the conducting position, start relay means energized when one selector button in each of said groups is in the conducting position, index motor means energized when said start relay is energized, said index motor means being adapted to drive an object between first and second limits, sensing circuit means to de-energize said indexing motor and stop said object at a selected position between said limits and energize a sequencing motor to drive said object transversely of said first and second limits, rotary switch means operatively connected to said sequencing motor to de-energize said start relay means, said start relay means having switch means associated therewith which moves to the closed position when said start relay is de-energized to supply voltage and current to a reverse field in said indexing motor whereby said object will be driven toward said first limit, and means to de-energize said motor when said object reaches said limit.

32. The control circuit of claim 31 wherein said start relay includes additional switch means which closes when said start relay is de-energized, said switch means being connected to a plurality of latch solenoids to restore said selector button switch means to the non-actuated position.

References Cited by the Examiner

UNITED STATES PATENTS

| | | | |
|---|---|---|---|
| 2,274,051 | 2/1942 | Feltman | 221—240 X |
| 2,354,896 | 8/1944 | Weiler | 194—10 |
| 2,655,242 | 10/1953 | Chafin et al. | 194—10 |
| 2,724,024 | 11/1955 | Durant et al. | 200—11 |
| 2,892,568 | 6/1959 | Tyler et al. | 221—240 X |
| 2,906,385 | 9/1959 | Groves | 194—10 |
| 3,030,461 | 4/1962 | Gantz | 200—11 |
| 3,031,055 | 5/1962 | Soule | 194—10 |
| 3,050,214 | 8/1962 | Kopf | 221—240 |
| 3,173,530 | 3/1965 | Lord | 194—2 |

RAPHAEL M. LUPO, *Primary Examiner.*

SAMUEL F. COLEMAN, LOUIS J. DEMBO, *Examiners.*

S. H. TOLLBERG, *Assistant Examiner.*